US008547883B2

(12) United States Patent
Jung et al.

(10) Patent No.: US 8,547,883 B2
(45) Date of Patent: Oct. 1, 2013

(54) METHOD AND SYSTEM FOR TRANSMITTING RESOURCE ALLOCATION INFORMATION IN COMMUNICATION SYSTEM

(75) Inventors: Young-Ho Jung, Suwon-si (KR); Yung-Soo Kim, Seongnam-si (KR); Myeon-Kyun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 12/194,398

(22) Filed: Aug. 19, 2008

(65) Prior Publication Data

US 2009/0052355 A1 Feb. 26, 2009

(30) Foreign Application Priority Data

Aug. 23, 2007 (KR) ........................ 10-2007-0085171

(51) Int. Cl.
*H04J 3/00* (2006.01)
*H04J 1/00* (2006.01)
*H04J 4/00* (2006.01)
*H04W 4/00* (2009.01)
(52) U.S. Cl.
USPC ........... 370/281; 370/280; 370/329; 370/330; 370/436; 370/478

(58) Field of Classification Search
None
See application file for complete search history.

(56) References Cited

U.S. PATENT DOCUMENTS

| 7,068,639 | B1 * | 6/2006 | Varma et al. | 370/347 |
|---|---|---|---|---|
| 2008/0089309 | A1 * | 4/2008 | Groleau et al. | 370/342 |
| 2008/0198830 | A1 * | 8/2008 | Mohanty et al. | 370/342 |
| 2011/0090826 | A1 * | 4/2011 | Jones et al. | 370/281 |

* cited by examiner

*Primary Examiner* — Jutai Kao
(74) *Attorney, Agent, or Firm* — Jefferson IP Law, LLP (57) ABSTRACT

A system and method for transmitting resource allocation information by a base station in a communication system is provided. The method includes generating first MAP messages for user terminals, each of which includes an identifier of a corresponding user terminal and corresponds to resource allocation information on a first band, in an order of user terminals, generating a second MAP message, which corresponds to resource allocation information for a user terminal allocated resources of only a second band, and generating third MAP messages, which correspond to resource allocation information on the second band, for user terminals allocated resources of both the first band and the second band, among the user terminals, in the order of user terminals allocated resources of both the first band and the second band, transmitting the first MAP message through the first band, and transmitting the second and third MAP messages through the second band.

23 Claims, 8 Drawing Sheets

METHOD AND SYSTEM FOR TRANSMITTING RESOURCE ALLOCATION INFORMATION IN COMMUNICATION SYSTEM

PRIORITY

This application claims the benefit under 35 U.S.C. §119(a) of a Korean patent application filed with the Korean Intellectual Property Office on Aug. 23, 2007 and assigned Serial No. 2007-85171, the entire disclosure of which is hereby incorporated by reference.

BACKGROUND OF THE INVENTION

1. Field of the Invention

The present invention relates to a method and system for transmitting resource allocation information in a communication system.

2. Description of the Related Art

Generally, in a communication system which supports both a paired band based on a Frequency Division Duplex (FDD) scheme and an unpaired band based on a Time Division Duplex (TDD) scheme, a base station separately transmits unpaired band allocation information and paired band allocation information to user terminals through the respective corresponding bands. Here, the term "paired band" denotes a band used when the FDD scheme is used, and the term "unpaired band" denotes a band used when the TDD scheme is used.

Figure 1:
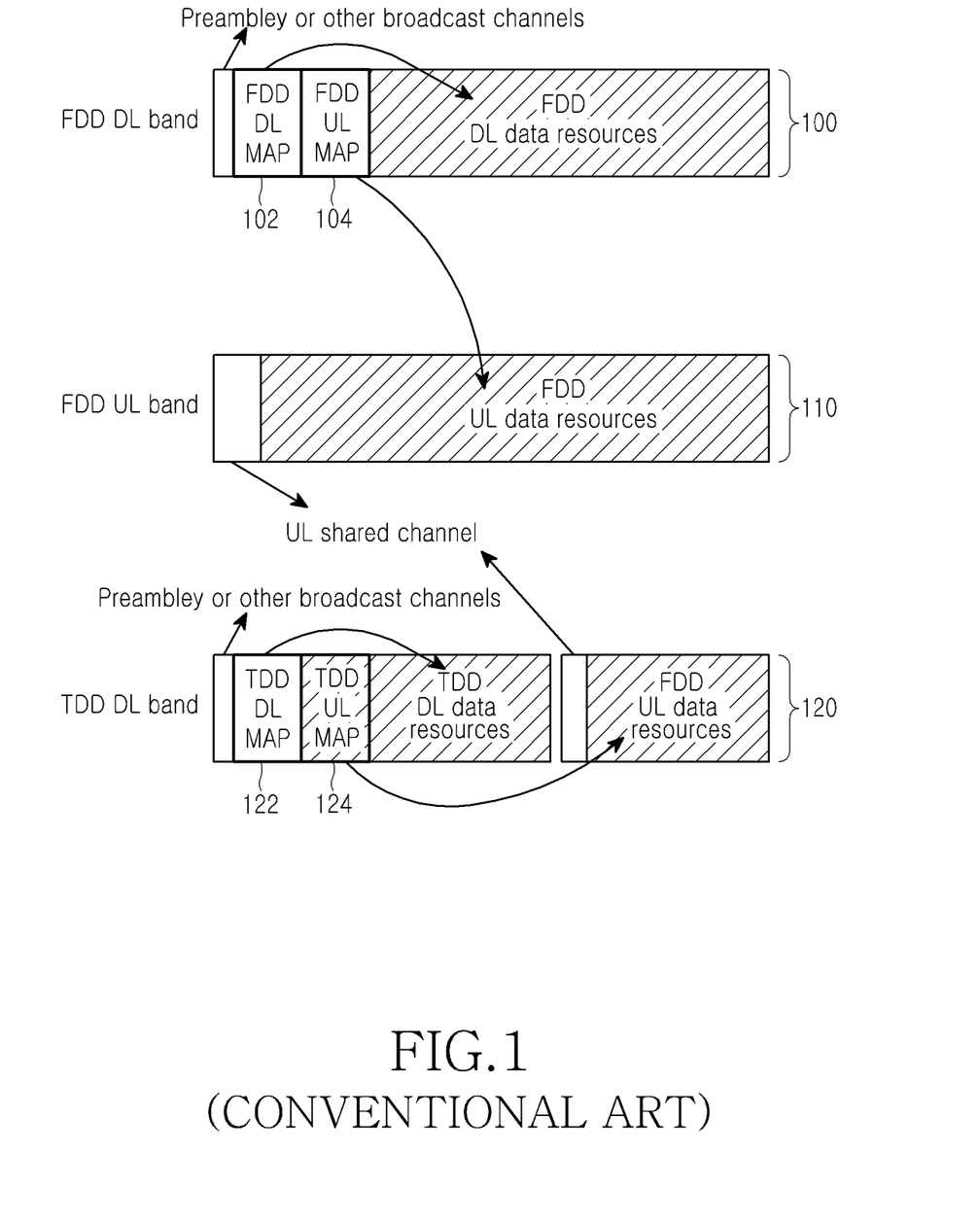
FIG. 1 is a view illustrating a conventional configuration of resource allocation information.

FIG. 1 is a view schematically explaining a conventional operation for transmitting resource allocation information.

An FDD DownLink (DL) band 100 and an FDD UpLink (UL) band 110, which are paired bands, and a TDD band 120, which is an unpaired band, are used in a communication system.

In the communication system, a base station transmits resource allocation information about the paired bands through the FDD DL band 100 by means of an FDD DL MAP message 102 and an FDD UL MAP message 104. Also, the base station transmits resource allocation information about the unpaired band through the TDD band 120 by a TDD DL MAP message 122 and a TDD UL MAP message 124. In this case, resource allocation information may be different depending on standards used in the communication system, but since MAP messages for the same user terminal are transmitted through the FDD DL band 100 and the TDD band 120, respectively, there is a problem in that an overhead occurs due to overlapping transmission of a user ID and so on.

According to the conventional method for transmitting resource allocation information, as described above, the resource allocation information is transmitted according to each corresponding band, regardless of specifications of a user terminal. However, when a user terminal has specifications which enable the user terminal to receive both the paired band and the unpaired band, the user terminal can be allocated resources through only one of the bands according to each reception frame. However, according to the conventional method, since the user terminal cannot identify whether the resource allocation information is for the paired band or for the unpaired band, the user terminal must receive and decode both a TDD MAP message and an FDD MAP message, transmitted from the base station, thereby causing large power consumption.

Therefore, a need exists for an improved system and method for efficiently transmitting resource allocation information to a user terminal.

SUMMARY OF THE INVENTION

An aspect of the present invention is to address the above-mentioned problems and/or disadvantages and to provide at least the advantages described below. Accordingly, an aspect of the present invention is to provide a method for efficiently transmitting resource allocation information to a user terminal.

Another aspect of the present invention is to provide a method for enabling a user terminal to decode only a MAP message for corresponding resources, by transmitting an indicator that indicates resource allocation information about resources allocated to the user terminal.

Another aspect of the present invention is to provide a method for transmitting resource allocation information to a user terminal, without overlapping transmission of a user ID and so on.

In accordance with an aspect of the present invention, a method for transmitting resource allocation information by a base station in a communication system is provided. The method includes generating first MAP messages for user terminals, each of which includes an identifier of a corresponding user terminal and corresponds to resource allocation information on a first band, in an order of user terminals, generating a second MAP message, which corresponds to resource allocation information for a user terminal allocated resources of only a second band, and generating third MAP messages, which correspond to resource allocation information on the second band, for user terminals allocated resources of both the first band and the second band, among the user terminals, in an order of user terminals allocated resources of both the first band and the second band, transmitting the first MAP message through the first band, and transmitting the second and third MAP messages through the second band.

In accordance with another aspect of the present invention, a system for transmitting resource allocation information in a communication system is provided. The system includes user terminals, and a base station for generating first MAP messages for the user terminals, each of which includes an identifier of a corresponding user terminal and corresponds to resource allocation information on a first band, in an order of user terminals, for generating a second MAP message, which corresponds to resource allocation information for a user terminal allocated resources of only a second band, for generating third MAP messages, which correspond to resource allocation information on the second band, for user terminals allocated resources of both the first band and the second band, among the user terminals, in an order of user terminals allocated resources of both the first band and the second band, for transmitting the first MAP message through the first band, and for transmitting the second and third MAP messages through the second band.

In accordance with still another aspect of the present invention, a method for transmitting resource allocation information by a base station in a communication system is provided. The method includes generating a first MAP message corresponding to resource allocation information on a first band for each user terminal, which is included in a first user terminal group allocated resources of only the first band, generating a second MAP message corresponding to resource allocation information according to each user terminal, which is included in a second user terminal group allocated resources of both the first band and a second band, generating a third MAP message corresponding to resource allocation information on the second band for each user terminal, which is included in a third user terminal group allocated resources of only the second band, and transmitting the first MAP message and the second MAP message through the first band, and transmitting the third MAP message through the second band.

In accordance with still another aspect of the present invention, a system for transmitting resource allocation information in a communication system is provided. The system includes user terminals, a message generation unit for generating a first MAP message corresponding to resource allocation information on a first band for each user terminal, which is included in a first user terminal group allocated resources of only the first band, generating a second MAP message corresponding to resource allocation information according to each user terminal, which is included in a second user terminal group allocated resources of both the first band and a second band, and generating a third MAP message corresponding to resource allocation information on the second band for each user terminal, which is included in a third user terminal group allocated resources of only the second band, and a transmission unit for transmitting the first MAP message and the second MAP message through the first band, and transmitting the third MAP message through the second band.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations are omitted for clarity and conciseness.

The present invention will be described through detailed illustration of two exemplary embodiments. According to a first exemplary embodiment, when a base station simultaneously transmits resource allocation information on a paired band and the resource allocation information on an unpaired band to a user terminal capable of using both Frequency Division Duplex (FDD) scheme and Time Division Duplex (TDD) scheme, the base station transmits a MAP message including the resource allocation information on each band according to each band. According to a second exemplary embodiment, when a base station simultaneously transmits resource allocation information on a paired band and the resource allocation information on an unpaired band to a user terminal capable of using both the FDD scheme and the TDD scheme, the base station transmits the respective MAP messages including the resource allocation information on each of the paired band and unpaired band through one band. Here, it is assumed that the base station can support both the paired band and the unpaired band in a communication system, and an exchange of information about the paired band and unpaired band, determined for transmission/reception of signals through a broadcast channel or the like, has already been achieved.

According to the first exemplary embodiment of the present invention, the resource allocation information on the paired band is transmitted by using an FDD MAP message, which is transmitted only through the paired band, and the resource allocation information on the unpaired band is transmitted by using a TDD MAP message, which is transmitted only through the unpaired band. In this case, to prevent the same information from being transmitted overlappingly through the TDD MAP message and FDD MAP message, only a MAP message transmitted through a band having a priority, of the paired band and the unpaired band, includes a corresponding user IDentification (ID), i.e. a Caller ID (CID), while a MAP message transmitted through the other band does not include the CID.

A user terminal capable of using both the TDD scheme and the FDD scheme is defined as a new terminal, and a user terminal capable of using only one of the TDD and FDD schemes is defined as an existing terminal (hereinafter, referred to as a "legacy terminal"). There are provided two methods according to whether the legacy terminal and the new terminal are compatible with each other in a communication system, which supports both the paired band and the unpaired band.

Figure 2A:
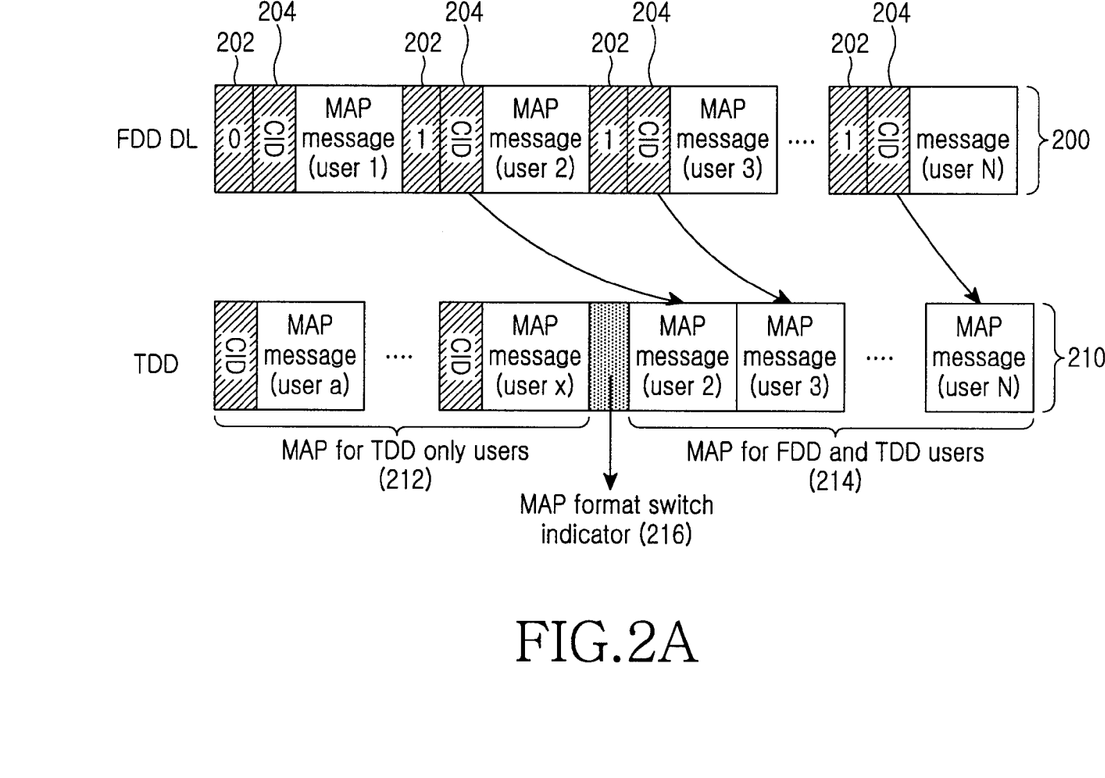
FIGS. 2A to 2C are views illustrating resource allocation information configurations in MAP messages to transmit resource allocation information for a new terminal according to a first exemplary embodiment of the present invention.
Figure 2B:
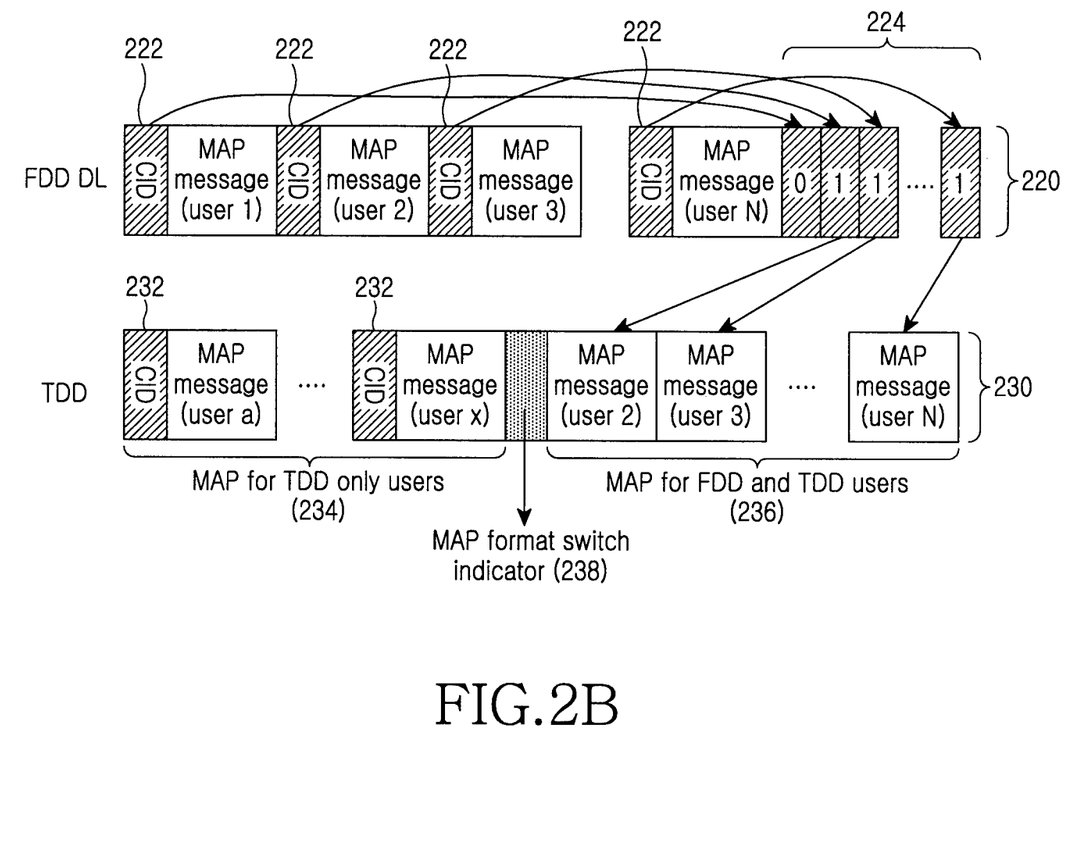
Figure 2C:
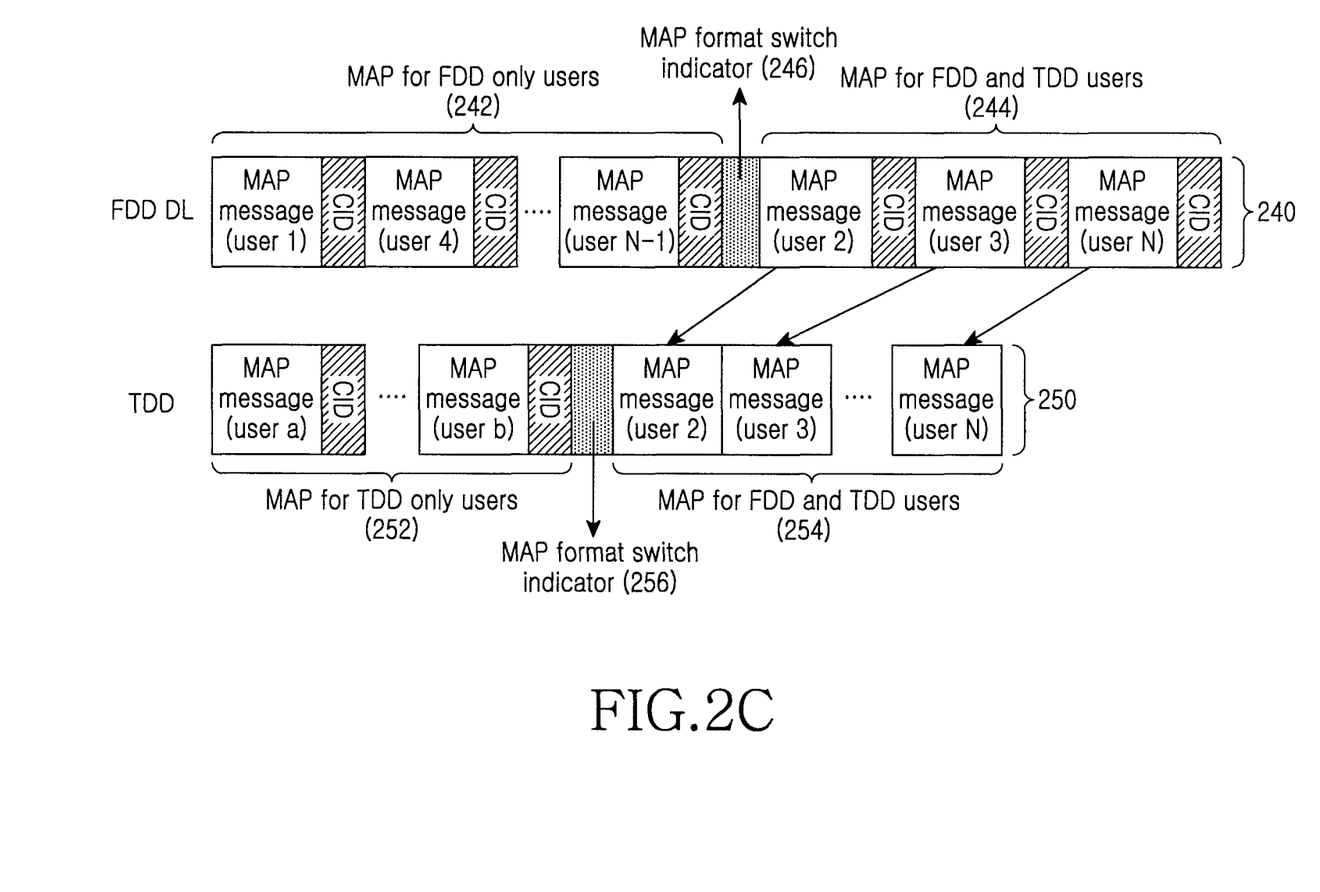

FIGS. 2A to 2C are views illustrating resource allocation information configurations in MAP messages to transmit resource allocation information for a new terminal according to the first exemplary embodiment of the present invention. Here, the communication system supports both the paired band and the unpaired band.

Referring to FIG. 2A, a base station in the communication system transmits allocation information for the paired band through an FDD DL band 200, and transmits allocation information for the unpaired band through a TDD band 210. Here, it is assumed that the FDD DL band 200 has a higher priority than the TDD band 210.

First, the base station successively generates and transmits FDD MAP messages to be transmitted according to each user terminal through the FDD DL band 200. Each FDD MAP message includes a one-bit indicator 202 for indicating whether resources of the unpaired band are allocated to a corresponding user, i.e. whether a TDD MAP message is allocated, and a CID field 204 for an ID of the user. In this case, the base station generates FDD MAP messages in which the value of the indicator 202 is set to "0" (i.e. FDD MAP messages for user terminals to which only an FDD MAP message is allocated), and FDD MAP messages in which the value of the indicator 202 is set to "1" (i.e. FDD MAP messages for user terminals to which both the FDD MAP message and the TDD MAP message are allocated), in an order of user terminals.

Next, the base station transmits the respective TDD MAP messages generated according to each user terminal through the TDD band 210. In this case, the base station first successively generates and transmits TDD MAP messages 212 for user terminals to which resources of only an unpaired band are allocated, that is, the TDD MAP messages 212 in which the value of the indicator 202 is set to "0," generates and transmits a MAP message format switch indicator 216 for indicating that the value of the indicator 202 is changed, and then generates and transmits TDD MAP messages 214 in which the value of the indicator 202 is set to "1," in an order of user terminals. In this case, each of the TDD MAP messages 212 for user terminals, to which resources of only the unpaired band are allocated, includes the CID of each corresponding user terminal. In contrast, the TDD MAP messages 214 for user terminals, which follow the MAP message format switch indicator 216 and include the value of the indicator 202 set to "1," do not include the respective CIDs to avoid overlapping transmission, because the respective CIDs are included in corresponding FDD MAP messages generated in the FDD DL band.

In an exemplary implementation, user terminal #1 searches FDD MAP messages transmitted from the base station through the FDD DL band 200 for an FDD MAP message including its own CID, by checking CIDs included in the FDD MAP messages. Thereafter, when it is determined that the value of the indicator 202 in an FDD MAP message found through the search has been set to "0," user terminal #1 decodes only the found FDD MAP message and acquires resource allocation information on a paired band.

In another exemplary implementation, user terminal #2 searches FDD MAP messages transmitted from the base station through the FDD DL band 200 for an FDD MAP message including its own CID, by checking CIDs included in the FDD MAP messages. Thereafter, when it is determined that the value of the indicator 202 in an FDD MAP message found through the search has been set to "1," user terminal #2 counts TDD MAP messages transmitted from the base station through the TDD band 210. In detail, user terminal #2 counts TDD MAP messages 212 as many as the number of user terminals allocated resources of only an unpaired band which has been reported from the base station in advance. Then user terminal #2 decodes a TDD MAP message corresponding to its own order, among TDD MAP messages which follow the counted TDD MAP messages and include the value of the indicator 202 set to "1," thereby acquiring resource allocation information on an unpaired band. In this case, user terminal #2 may decode an FDD MAP message in advance, and acquire information about its order given among the user terminals, to which the FDD MAP messages including the value of the indicator 202 set to "1" are transmitted. In addition, while decoding TDD MAP messages, user terminal #2 can understand that TDD MAP messages, received until the MAP message format switch indicator 216 is received, correspond to resource allocation information for user terminals which are allocated resources of only the TDD band 210, and TDD MAP messages including TDD-band resource allocation information for user terminals allocated resources of both the FDD DL band 200 and the TDD band 210 is transmitted without a CID after the MAP message format switch indicator 216 has been received. Among the MAP messages, a MAP message corresponding to the order of each user terminal is decoded. Meanwhile, in the case where users are informed, through a separate broadcast channel, of the number of user terminals which are allocated only TDD-band resources, after the resource allocation for a user terminal allocated only the TDD-band resources has finished, the user terminal adds a value corresponding to its order given among user terminals, to which FDD MAP messages including the value of indicator 202 set to "1," are transmitted, to the number of user terminals allocated only the TDD-band resources, which is informed through the broadcast channel, thereby acquiring position information of a TDD MAP message to be decoded by the user terminal, among the entire MAP messages. In this case, there is no need to transmit the MAP message format switch indicator 216 shown in FIG. 2A.

Referring to FIG. 2B, the base station transmits resource allocation information on a paired band through an FDD DL band 220, and transmits resource allocation information on an unpaired band through a TDD band 230.

After successively generating and transmitting FDD MAP messages including CID fields 222 according to user terminals through the FDD DL band 220, the base station generates one-bit indicators, each of which indicates whether an unpaired band is allocated to the user terminal corresponding to each generated FDD MAP message, according to the order of the generated FDD MAP messages, and arranges the one-bit indicators in regular sequence after the FDD MAP messages, as an indicator group 224. Although the exemplary embodiment of the present invention is described about the case where the indicator group 224 is allocated to the FDD DL band 220, the indicator group 224 may be disposed, regardless of the priorities of the FDD DL band 220 and the TDD band 230.

The base station successively generates TDD MAP messages 234 for user terminals allocated only unpaired-band resources, which are transmitted through the TDD band 230, and then generates TDD MAP messages 236 in the order of user terminals, to which an indicator value of "1" has been allocated through the FDD DL band 220. In this case, each of the TDD MAP messages 234 for user terminals allocated only the TDD-band resources includes a CID 232 of each corresponding user terminal. The TDD MAP messages 236 for user terminals, to which the indicator value of "1" has been allocated through the FDD DL band 220, include only TDD-band resource allocation information because the FDD MAP messages allocated to the user terminals through the FDD DL band 220 include CIDs of the user terminals, respectively. In this case, to distinguish TDD MAP messages including an indicator value of "0" from TDD MAP messages including an indicator value of "1" through the indicator group 224, the base station allocates a MAP message format switch indicator 238 after TDD MAP messages for user terminals allocated only the TDD-band resources, like in FIG. 2A, or informs user terminals of the number of user terminals allocated only TDD-band resources through a separate broadcast channel.

Each user terminal acquires an FDD MAP message corresponding to the CID of the user terminal from among FDD MAP messages received through the FDD DL band 220, identifies an indicator value corresponding to the order of the mobile terminal from the indicator group 224, and decodes only the acquired FDD MAP message when the indicator value is "0." In contrast, when the identified indicator value is "1," the mobile terminal finds and decodes a TDD MAP message corresponding to the order of the mobile terminal, from among TDD MAP messages for user terminals, which include an indicator value of "1," and are received from the base station after TDD MAP messages for user terminals allocated only unpaired-band resources have been received. In detail, the user terminal may decode an FDD MAP message in advance, and acquire information about its order given among the user terminals, to which the FDD MAP messages including the value of the indicator 224 set to "1" are transmitted. In addition, while decoding TDD MAP messages, the user terminal recognizes TDD MAP messages, received until the MAP message format switch indicator 238 appears, to correspond to resource allocation information for user terminals which are allocated only TDD-band resources. Thereafter, since TDD-band resource allocation information for user terminals allocated resources of both the FDD and TDD bands is transmitted without a CID after the MAP message format switch indicator 238 has been received, the user terminal decodes a TDD MAP message corresponding to the order of the user terminal among TDD MAP messages received after the MAP message format switch indicator 238.

Also, in the case where the number of user terminals allocated only TDD-band resources is reported through a separate broadcast channel, after resource allocation for a user terminal allocated only the TDD-band resources has finished, a corresponding user terminal adds a value corresponding to its order given among user terminals, to which FDD MAP messages including the value of indicator 224 set to "1," are transmitted, to the number of user terminals allocated only the TDD-band resources, which is informed through the separate broadcast channel, thereby acquiring position information of a TDD MAP message to be decoded by the user terminal, among the TDD MAP messages. In this case, there is no need to transmit the MAP message format switch indicator 238 shown in FIG. 2B.

Referring to FIG. 2C, the base station successively generates FDD MAP messages 242, which include CID fields according to users for user terminals allocated only paired-band resources, and are transmitted through an FDD DL band 240, and then generates FDD MAP messages 244 for user terminals using both a paired band and an unpaired band. FDD MAP messages 244 for user terminals using both the paired band and the unpaired band also include CIDs according to users, respectively.

The base station successively generates successively generates TDD MAP messages 252, which include CID fields according to users for user terminals allocated only unpaired-band resources, and are transmitted through a TDD band 250, and then generates TDD MAP messages 254 for user terminals using resources of both the paired band and the unpaired band. TDD MAP messages 254 for user terminals using both the paired band and the unpaired band do not include CIDs according to user terminals because FDD MAP messages 244 for user terminals using both the paired band and the unpaired band are allocated the CIDs according to user terminals, respectively.

Like in FIG. 2A, the base station informs a corresponding user terminal of a switch part in the characteristic of a MAP message through MAP message format switch indicators 246 and 256, or informs the user terminal of the number of user terminals allocated only an FDD band and of the number of user terminals allocated only a TDD band in advance through a separate broadcast channel.

In an exemplary implementation, user terminal #2 counts FDD MAP messages received through the FDD DL band 240 by the number of user terminals using only an FDD band, which is informed by a provider in advance. User terminal #2 checks CIDs of FDD MAP messages 244 received after the counted FDD MAP messages, finds an FDD MAP message corresponding to the CID of user terminal #2, decodes the found FDD MAP message, and finds the CID of user terminal #2 from among FDD MAP messages 244 using both the paired band and the unpaired band, thereby identifying its own order in the FDD MAP messages 244. Thereafter, user terminal #2 counts TDD MAP messages received through the TDD band 250 by the number of user terminals using only a TDD band. User terminal #2 decodes a TDD MAP message corresponding to the identified order among TDD MAP messages 254 which are received after the counted TDD MAP messages. In this case, there is no need to transmit the MAP message format switch indicators 246 and 256.

In another exemplary implementation, in the case of using the MAP message format switch indicators 246 and 256 shown in FIG. 2C, when a user terminal receives the MAP message format switch indicator 246 while decoding FDD MAP messages received through the FDD DL band 240, the user terminal recognizes that FDD MAP messages received after the MAP message format switch indicator 246 are for FDD band allocation for user terminals using both the FDD band and the TDD band. Thereafter, the user terminal checks CIDs of the FDD MAP messages 244, finds and decodes an FDD MAP message corresponding to the CID of the user terminal, and identifies its order given among TDD MAP messages 254 for user terminals using both the paired band and the unpaired band.

In contrast, when the user terminal receives the MAP message format switch indicator 256 while decoding TDD MAP messages received through the TDD band 250, the user terminal may recognize that TDD MAP messages 254 received after the MAP message format switch indicator 256 are for user terminals using resources of both the paired band and the unpaired band, and find and decode a TDD MAP message corresponding to the order of the user terminal among the TDD MAP messages 254.

Meanwhile, to assure backward compatibility with the existing system in which resources are allocated independently for each of TDD and FDD bands, the legacy terminal must be able to recognize the changed MAP messages, including an indicator or CID as shown in FIGS. 2A to 2C, as resource allocation information transmitted for other user terminals. In contrast, the new terminal recognizes the changed MAP messages as it desires.

Figure 3:
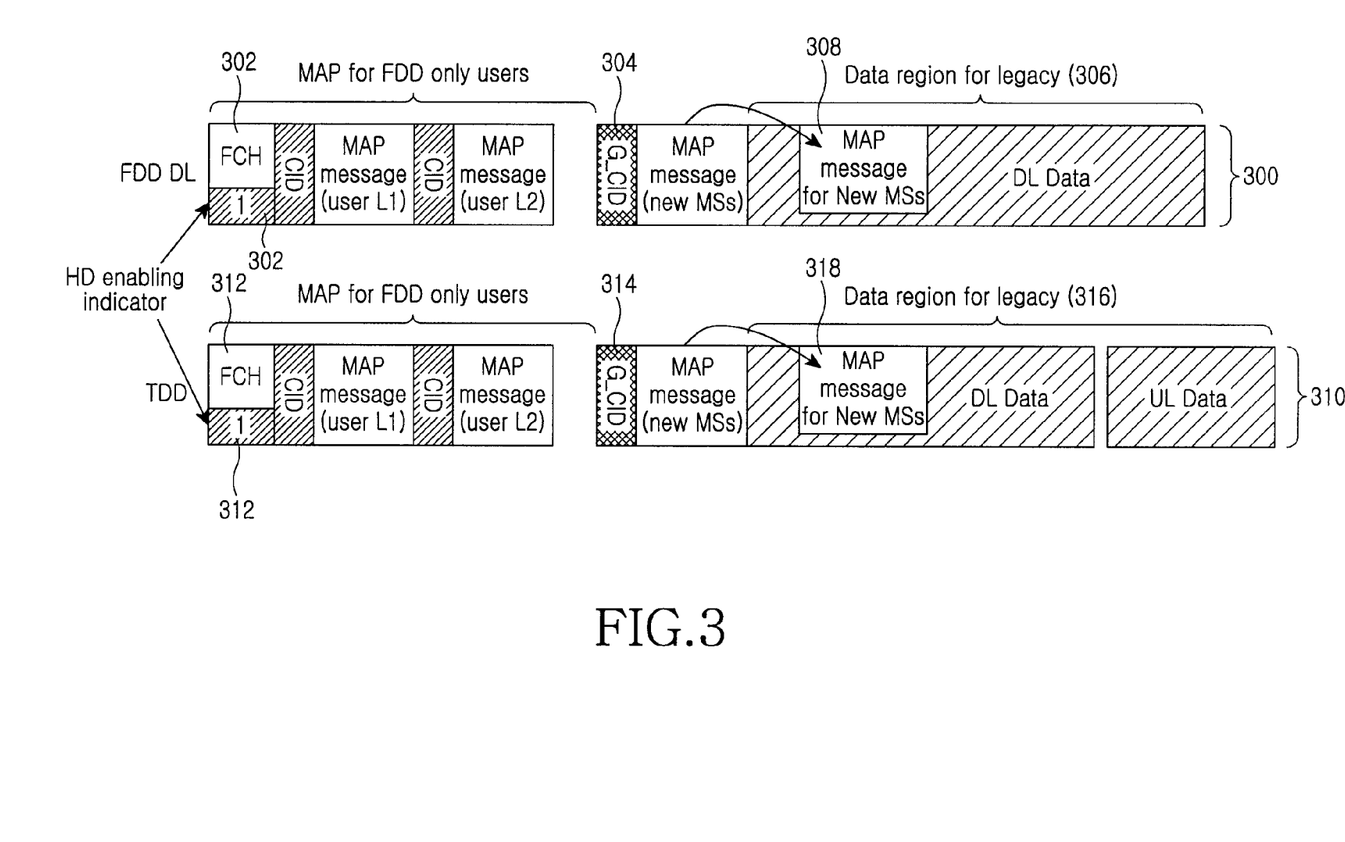
FIG. 3 is a view illustrating a resource allocation information configuration in a MAP message in which compatibility between a new terminal and a legacy terminal has been taken into consideration according to the first exemplary embodiment of the present invention.

FIG. 3 is a view illustrating a resource allocation information configuration in a MAP message in which compatibility between a new terminal and a legacy terminal has been taken into consideration according to the first exemplary embodiment of the present invention. Here, the communication system supports both a paired band and an unpaired band.

Referring to FIG. 3, a base station transmits paired-band allocation information through an FDD DL band 300 to user terminals, and transmits unpaired-band allocation information through a TDD band 310 to the user terminals. Although the following description will be given about a case where the FDD DL band 300 has a higher priority than the TDD band 310, the exemplary embodiment of the present invention can be applied to the opposite case, as well.

First, the base station allocates FDD MAP messages for legacy terminals using only a paired band, among FDD MAP messages transmitted through the FDD DL band 300. In this case, the base station allocates a new terminal an HD enabling indicator 302, representing whether an FDD MAP message and a TDD MAP message can be allocated at the same time, by using a reserved bit in either a Fundamental CHannel (FCH) of an existing standard or a separate broadcast channel which can be checked before MAP message decoding.

Next, the base station allocates a group indicator 304 for classifying new terminals capable of recognizing that MAP messages changed as shown in FIGS. 2A to 2C are for the new terminals and legacy terminals recognizing that the changed MAP messages are not for the legacy terminals, as different classes. Also, the base station allocates a new FDD MAP message 308 for the new terminals to a data transmission region 306 of the FDD DL band 300. The new FDD MAP message 308 may be configured in various methods as shown in FIGS. 2A to 2C, according to the respective CIDs of new terminals which are classified as a corresponding class.

The base station first generates TDD MAP messages for legacy terminals allocated only a TDD band, among TDD MAP messages transmitted through the TDD band 310. In this case, the base station uses a reserved bit in either a Fundamental CHannel (FCH) of an existing standard or a separate broadcast channel which can be checked before MAP message decoding, as an indicator 312 indicating whether a new terminal can be allocated an FDD band and a TDD band at the same time. Next, the base station allocates a group indicator 314 for classifying new terminals, which can recognize MAP messages changed as shown in FIGS. 2A to 2C, as one class, and allocates a new TDD MAP message 318 for the new terminals to a data transmission region 316 of the TDD band 310. The new TDD MAP message 318 may be configured in various methods as shown in FIGS. 2A to 2C.

That is, the base station allocates a group ID for class distinction between the new terminals and the legacy terminals, in addition to an existing CID, to each new terminal, which can be allocated both a paired band and an unpaired band.

When the HD enabling indicator 302 is in an enabling state, the new terminal searches CIDs of FDD MAP messages transmitted through the FDD DL band 300 for an FDD MAP message to which a group ID is allocated. When the group ID of the FDD MAP message corresponds to a new terminal class, the new terminal decodes a new FDD MAP message 308 existing in a data transmission region 306 appointed by the FDD MAP message, to which the group ID is allocated. The base station allocates FDD MAP messages and TDD MAP messages according to the users of new terminals through use of the methods described with reference to FIGS. 2A to 2C.

According to the first exemplary embodiment of the present invention, as described above, the same information is prevented from being overlappingly transmitted, so that overhead can be reduced. However, since the base station transmits a MAP message through both a TDD band and an FDD UL band, a corresponding terminal may decode all MAP messages received through the TDD band and FDD UL band.

Therefore, according to the second exemplary embodiment of the present invention, a method for allocating resource allocation information on a paired band and an unpaired band through one band having priority is proposed. In detail, the second exemplary embodiment of the present invention is implemented in two methods according to whether the new terminal is compatible with the legacy terminal in a communication system, which supports both a paired band and an unpaired band.

Figure 4A:
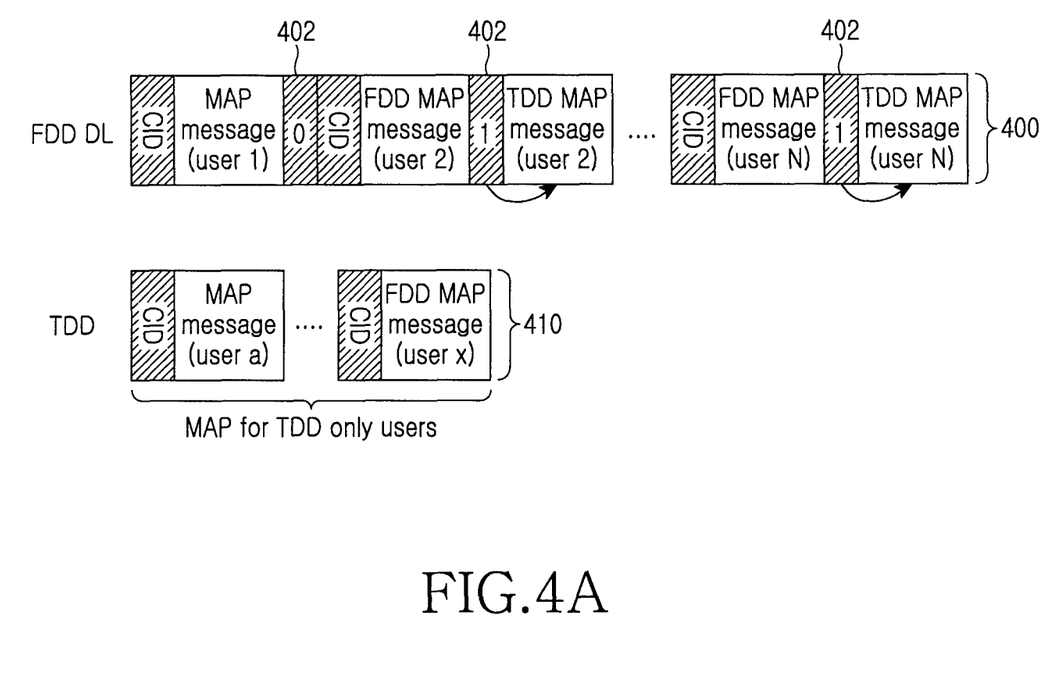
FIGS. 4A to 4B are views illustrating resource allocation information configurations in MAP messages to transmit resource allocation information for a new terminal according to a second exemplary embodiment of the present invention.
Figure 4B:
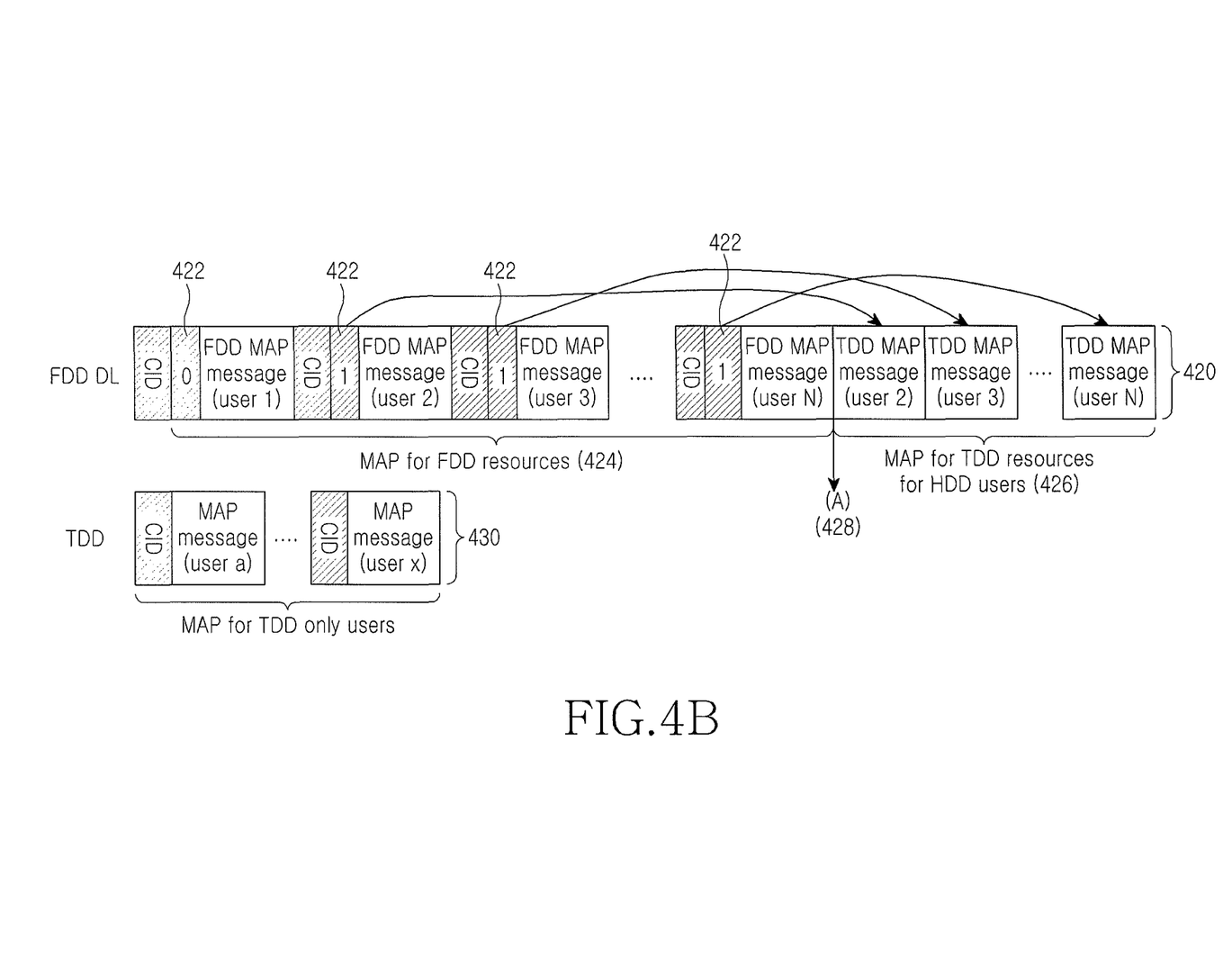

FIGS. 4A to 4B are views illustrating resource allocation information configurations in MAP messages to transmit resource allocation information for a new terminal according to the second exemplary embodiment of the present invention. Here, the communication system supports both the paired band and the unpaired band.

Referring to FIG. 4A, an FDD DL band 400 and a TDD band 410, which are a paired band and an unpaired band, respectively, are used in the communication system. Here, it is assumed that the FDD DL band 400 has a higher priority than the TDD band 410.

The base station generates and transmits an FDD MAP message according to each user terminal through the FDD DL band 400. In this case, the FDD MAP message includes a CID of a corresponding user, and an indicator 402 for indicating whether a TDD MAP message is allocated. When the indicator 402 has a value of "1," a TDD MAP message is allocated next to an FDD MAP message for a corresponding user terminal in the FDD DL band 400. In an exemplary implementation, when user terminal #2 confirms an FDD MAP message corresponding to the CID of user terminal #2 and an indicator 402 having a value of "1" through the FDD DL band 400, the user terminal #2 decodes a TDD MAP message allocated next to the FDD MAP message, thereby acquiring resource allocation information on the TDD band, as well.

Referring to FIG. 4B, a base station uses an FDD DL band 420 and a TDD band 430, which are a paired band and an unpaired band, respectively. Here, it is assumed that the FDD DL band 420 has a relatively higher priority.

The base station generates FDD MAP messages to be transmitted according to each user terminal through the FDD DL band 420. In this case, each FDD MAP message includes a CID of each corresponding user, and an indicator 422 for indicating whether a TDD MAP message is allocated. When the base station has completed the generation of the FDD MAP messages 424, the base station successively allocates TDD MAP messages 426 with respect to cases where the indicator 422 has a value of "1," that is, TDD MAP messages 426 for user terminals which are allocated both an FDD MAP message and a TDD MAP message. Thereafter, the base station successively allocates TDD MAP messages for user terminals using only the TDD band, through the TDD band 430. The two types of MAP messages may be distinguished in such a manner as to allocate a MAP message format switch indicator 428 at point A so as to inform user terminals of the point where the characteristic of a MAP message is switched, or in a such a manner that the base station informs user terminals of the number of users allocated only either a TDD band or an FDD band through a separate broadcast channel.

User terminal #2 confirms an FDD MAP message corresponding to a CID of user terminal #2 and an indicator 422 through the FDD DL band 420. When the indicator 422 confirmed by user terminal #2 has a value of "1," user terminal #2 confirms its order given among user terminals allocated an indicator 422 having a value of "1," which is informed from the base station in advance, checks a TDD MAP message corresponding to the order of user terminal #2 from among TDD MAP messages 426 including no CID, and decodes the corresponding TDD MAP message.

Figure 5:
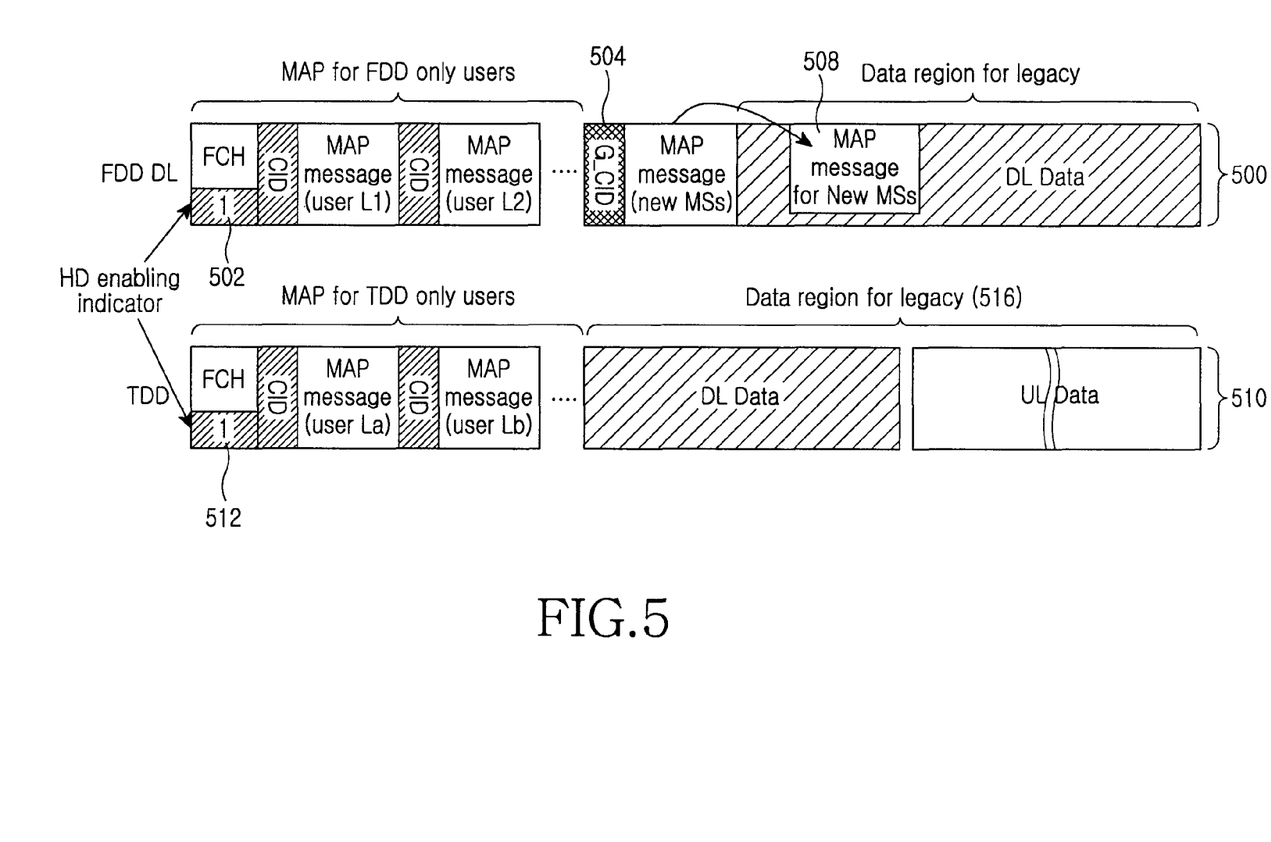
FIG. 5 is a view illustrating a configuration for resource allocation information when it is not possible to change an existing MAP message for a dedicated user terminal which can be allocated both a paired band and an unpaired band at the same time according to the second exemplary embodiment of the present invention.

FIG. 5 is a view illustrating a configuration for resource allocation information when it is not possible to change an existing MAP message for a user terminal which can be allocated both a paired band and an unpaired band at the same time according to the second exemplary embodiment of the present invention.

Referring to FIG. 5, resource allocation information for a paired band is transmitted only through an FDD DL band 500, and the resource allocation information on an unpaired band is transmitted only through a TDD band 510. Although the following description will be given about a case where the FDD DL band 500 has a priority as an example, the exemplary embodiment of the present invention may be applied to the opposite case, as well.

Through the FDD DL band 500, FDD MAP messages for legacy terminals allocated only FDD-band resources are first allocated. In this case, a reserved bit in either a Fundamental CHannel (FCH) of an existing standard or a separate broadcast channel which may be checked before MAP message decoding is used as an enabling indicator 502 indicating whether a new terminal can be allocated an FDD band and a TDD band at the same time.

Next, a group indicator 504 for classifying new terminals capable of recognizing a change of resources in a resource allocation message, as one class, is allocated, and a new MAP message 508 for the new terminals is allocated to a data transmission region of the FDD DL band 500. The new MAP message 508 may be configured in various methods as shown in FIGS. 4A and 4B, according to the respective CIDs of new terminals which are included in the corresponding class. That is, the new MAP message 508 is transmitted only through the FDD DL band 500 having a priority, wherein both an FDD MAP message and a TDD MAP message are allocated for new terminals, which can be allocated both an FDD band and a TDD band at the same time.

Through the TDD band 510, TDD MAP messages for legacy terminals allocated only TDD-band resources are first allocated. In this case, a reserved bit in either a Fundamental CHannel (FCH) of an existing standard or a separate broadcast channel which can be checked before MAP message decoding is used as an enabling indicator 512 indicating whether a new terminal can be allocated an FDD band and a TDD band at the same time. Thereafter, a data transmission region 516 for the legacy terminals is allocated.

Similarly, a group indicator for classifying new terminals capable of recognizing a change of resources in a resource allocation message, as one class, is allocated, and a new TDD MAP message for the new terminals is allocated to a data transmission region 516 of the TDD band 510. The new TDD MAP message may be configured in various methods as shown in FIGS. 2A to 2C.

A service provider allocates a group ID to new terminals, which are allocated both a TDD band and an FDD band, in addition to existing CIDs, to achieve class distinction between the new terminals and legacy terminals.

When the HD enabling indicator is in an enabling state, the new terminal searches CIDs of FDD MAP messages transmitted through the FDD DL band 500, for resource allocation information of an FDD MAP message to which a group ID has been allocated. By the FDD MAP message, a new FDD MAP message for the new terminal is allocated to the data transmission region. The new terminal decodes a new FDD MAP message 508 existing in the data transmission region appointed by the FDD MAP message, and decodes resource allocation information allocated for a corresponding CID, which is configured as shown in FIGS. 2A to 2C.

The present invention is not limited to the aforementioned exemplary embodiments and the accompanying drawings, and it will be understood by those skilled in the art that various changes in form and details may be made therein without departing from the spirit and scope of the present invention.

According to exemplary embodiments of the present invention, when a MAP message for a paired band and an unpaired band is transmitted to a new terminal which can be allocated resources through the paired band and the unpaired band at the same time, a CID is prevented from being overlappingly transmitted, so that overhead is reduced upon transmission of resource allocation information. Also, it is possible to assure compatibility between the new terminal and legacy terminals, which can be allocated resources only through one of the paired and unpaired bands. In addition, since resource allocation information for the new terminal is transmitted by using a MAP message transmitted through any one of the paired and unpaired bands, the new terminal has only to decode a MAP message transmitted through a corresponding band, so that the complexity is reduced.

While the invention has been shown and described with reference to certain exemplary embodiments thereof, it will be understood by those skilled in the art that various changes in form and details may be made therein without departing from the spirit and scope of the invention as defined by the appended claims and their equivalents. Accordingly, the scope of the invention is not to be limited by the above exemplary embodiments but by the claims and the equivalents thereof.

What is claimed is:

1. A method for transmitting resource allocation information by a base station in a communication system, the method comprising:
   (1) generating first control messages for user terminals, each of which includes an identifier of a corresponding user terminal and corresponds to resource allocation information on a first band;
   (2) generating a second control message, which corresponds to resource allocation information for a user terminal allocated resources of only a second band;
   (3) generating third control messages, which correspond to resource allocation information on the second band, for user terminals allocated resources of both the first band and the second band; and
   (4) transmitting the first control messages through the first band, and transmitting the second control message and third control messages through the second band,
   wherein the first band and the second band comprise mutually different bands corresponding to a downlink band of a paired band based on a Frequency Division Duplex (FDD) scheme, and an unpaired band based on a Time Division Duplex (TDD) scheme, respectively, or corresponding to the unpaired band and the downlink band of the paired band, respectively.

2. The method as claimed in claim 1, wherein the generating of the second control message further comprises allocating a first indicator for enabling a corresponding user terminal to distinguish the second control message and the third control message from each other in the second band,
   wherein the second control message comprises an identifier of the corresponding user terminal, and
   wherein the third control messages do not comprise the identifier of the corresponding user terminal.

3. The method as claimed in claim 1, further comprising transmitting a number of user terminals receiving the second control message and a number of user terminals receiving the third control messages to user terminals through a broadcast channel.

4. The method as claimed in claim 1, wherein the generating of the first control messages comprises:

allocating a second indicator which indicates whether the first band and the second band are together allocated, for each user terminal corresponding to each of the first control messages generated in an order of user terminals; and inserting the allocated second indicator according to each of the first control messages generated in the order of the user terminals.

5. The method as claimed in claim 1, wherein the generating of the first control messages comprises, after the first control messages are generated in an order of user terminals, successively allocating a second indicator which indicates whether the first band and the second band are together allocated, for each user terminal corresponding to each of the generated first control messages.

6. The method as claimed in claim 1,
wherein the generating of the first control messages further comprises allocating a third indicator for enabling a corresponding user terminal to distinguish a fourth control message and a fifth control message from each other in the first band,
wherein the first control messages comprise:
the fourth control message which corresponds to first-band resource allocation information for each user terminal allocated resources of only the first band; and
the fifth control message which corresponds to second-band resource allocation information for each user terminal allocated resources of both the first band and the second band.

7. The method as claimed in claim 1, further comprising a step of allocating a fourth indicator which indicates whether the communication system supports compatibility between a first user terminal and a second user terminal, and a group identifier for distinguishing the first user terminal and the second user terminal from each other,
wherein the first user terminal comprises a user terminal capable of using both the first band and the second band, and the second user terminal comprises a user terminal capable of using only one of the first and second bands.

8. The method as claimed in claim 7, further comprising a step of transmitting a sixth control message, which corresponds to resource allocation information on dedicated resources of the first user terminal, through a data transmission region of the first band.

9. The method as claimed in claim 1,
wherein a mobile terminal receives one of the first control messages including its own Caller IDdentification (CID) and an indicator transmitted from the base station through the first band and,
when it is determined that the value of the indicator in each of the first control messages has been set to a preset value, the mobile terminal decodes only the determined first control message and acquires resource allocation information on the paired band.

10. A base station for transmitting resource allocation information in a communication system, the base station comprising:
the base station for generating first control messages for user terminals, which includes an identifier of a corresponding user terminal and corresponds to resource allocation information on a first band,
for generating a second control message, which corresponds to resource allocation information for a user terminal allocated resources of only a second band,
for generating third control messages, which correspond to resource allocation information on the second band, for user terminals allocated resources of both the first band and the second band,
for transmitting the first control messages through the first band, and
for transmitting the second control message and third control messages through the second band,
wherein the first band and the second band comprises mutually different bands corresponding to a downlink band of a paired band based on a Frequency Division Duplex (FDD) scheme, and an unpaired band based on a Time Division Duplex (TDD) scheme, respectively, or corresponding to the unpaired band and the downlink band of the paired band, respectively.

11. The base station as claimed in claim 10, wherein the base station allocates a first indicator for enabling a corresponding user terminal to distinguish the second control message and the third control messages from each other in the second band,
wherein the second control message comprises an identifier of the corresponding user terminal, and the third control messages do not comprise the identifier of the corresponding user terminal.

12. The base station as claimed in claim 10, wherein the base station transmits a number of user terminals receiving the second control message and a number of user terminals receiving the third control messages to user terminals through a broadcast channel.

13. The base station as claimed in claim 10, wherein the base station allocates a second indicator which indicates whether the first band and the second band are together allocated, for each user terminal corresponding to each of the first control messages generated in an order of user terminals, and inserts the allocated second indicator according to each of the first control messages generated in the order of user terminals.

14. The base station as claimed in claim 10, wherein, after the first control messages are generated in an order of user terminals, the base station successively allocates a second indicator which indicates whether the first band and the second band are together allocated, for each user terminal corresponding to each of the generated first control messages.

15. The base station as claimed in claim 10, wherein the base station allocates a third indicator for enabling a corresponding user terminal to distinguish a fourth control message and a fifth control message from each other in the first band,
wherein the first control message comprises
the fourth control message which corresponds to first-band allocation information for each user terminal allocated resources of only the first band, and
the fifth control message which corresponds to second-band allocation information for each user terminal allocated resources of both the first band and the second band.

16. The base station as claimed in claim 10,
wherein the base station allocates a fourth indicator which indicates whether the communication system supports compatibility between a first user terminal and a second user terminal, and a group identifier for distinguishing the first user terminal and the second user terminal from each other,
wherein the first user terminal comprises a user terminal capable of using both the first band and the second band, and
wherein the second user terminal comprises a user terminal capable of using only one of the first and second bands.

17. The base station as claimed in claim 16, wherein the base station transmits a sixth control message, which corresponds to the first-band resource allocation information on dedicated resources of the first user terminal, through a data transmission region of the first band.

18. A method for transmitting resource allocation information by a base station in a communication system, the method comprising:
(1) generating a first control message corresponding to resource allocation information on a first band for each user terminal included in a first user terminal group allocated resources of only the first band;
(2) generating a second control message corresponding to resource allocation information according to each user terminal included in a second user terminal group allocated resources of both the first band and a second band;
(3) generating a third control message corresponding to resource allocation information on the second band for each user terminal included in a third user terminal group allocated resources of only the second band; and
(4) transmitting the first control message and the second control message through the first band, and transmitting the third control message through the second band,
wherein the first band and the second band comprise mutually different bands corresponding to a downlink band of a paired band based on a Frequency Division Duplex (FDD) scheme, and an unpaired band based on a Time Division Duplex (TDD) scheme, respectively, or corresponding to the unpaired band and the downlink band of the paired band, respectively.

19. The method as claimed in claim 18, wherein the transmitting of the control messages comprises:
inserting an identifier of a corresponding user terminal, and a first indicator which indicates whether the first band and the second band are together allocated to the corresponding user terminal, into the first control message, before transmitting the first control message through the first band; and
inserting an identifier of a corresponding user terminal into the third control message, before transmitting the third control message through the second band,
wherein the second control message comprises a fourth MAP message corresponding to resource allocation information on the first band.

20. The method as claimed in claim 19, wherein after the fourth control message is successively transmitted through the first band, the fifth control message is successively transmitted.

21. A base station for transmitting resource allocation information in a communication system, the base station comprising:
a message generation unit
for generating a first control message corresponding to resource allocation information on a first band for each user terminal included in a first user terminal group allocated resource of only the first band,
for generating a second control message corresponding to resource allocation information according to each user terminal included in a second user terminal group allocated resources of both the first band and a second band, and
for generating a third control message corresponding to resource allocation information on the second band for each user terminal included in a third user terminal group allocated resources of only the second band; and
a transmission unit for transmitting the first control message and the second control message through the first band and for transmitting the third control message through the second band,
wherein the first band and the second band comprise mutually different bands corresponding to a downlink band of a paired band based on a Frequency Division Duplex (FDD) scheme, and an unpaired band based on a Time Division Duplex (TDD) scheme, respectively, or corresponding to the unpaired band and the downlink band of the paired band, respectively.

22. The base station as claimed in claim 21, wherein the transmission unit inserts an identifier of a corresponding user terminal, and a first indicator which indicates whether the first band and the second band are together allocated to the corresponding user terminal, into the first control message, before transmitting the first control message through the first band, and inserts an identifier of a corresponding user terminal into the third control message, before transmitting the third control message through the second band,
wherein the second control message comprises a fourth control message corresponding to resource allocation information on the first band, and a fifth control message corresponding to resource allocation information on the second band, for each user terminal included in the second user terminal group.

23. The base station as claimed in claim 22, wherein the transmission unit successively transmits the fourth control message, which corresponds to resource allocation information on the first band for each user terminal included in the second user terminal group, and then successively transmits the fifth control message corresponding to resource allocation information on the second band.

* * * * *